Nov. 11, 1958   J. H. HOLLYDAY ET AL   2,859,686
BALE METERING AND TRIPPING MECHANISM
Filed Feb. 9, 1956   3 Sheets—Sheet 3
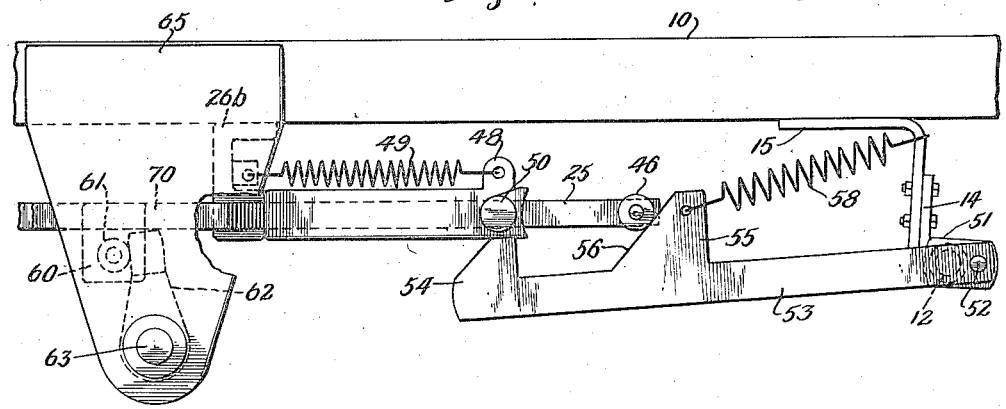
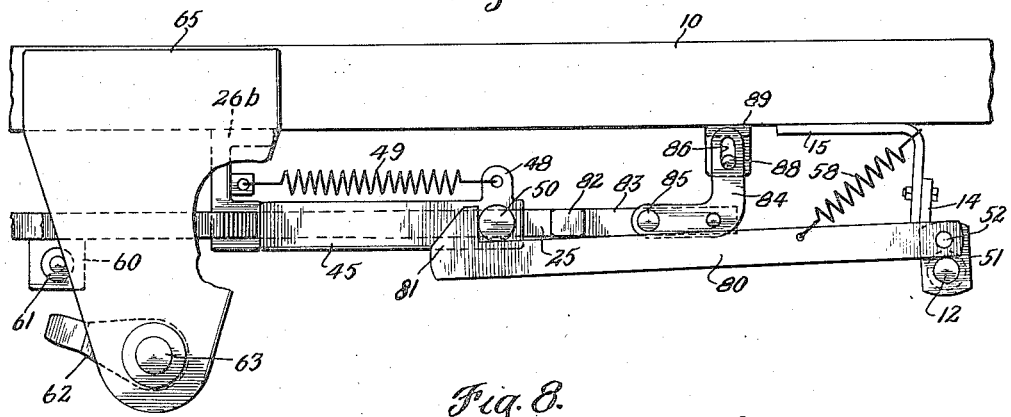
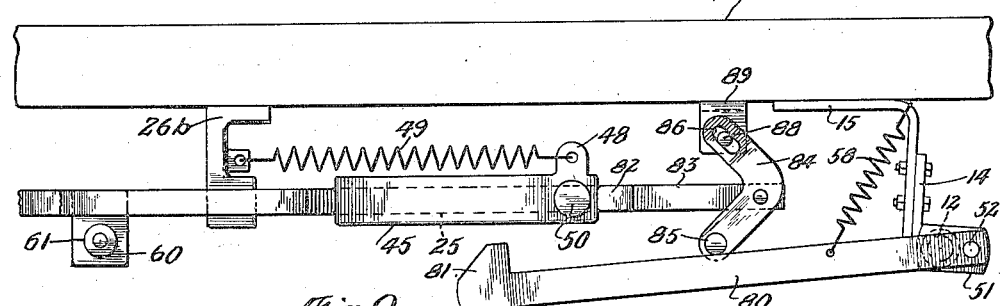
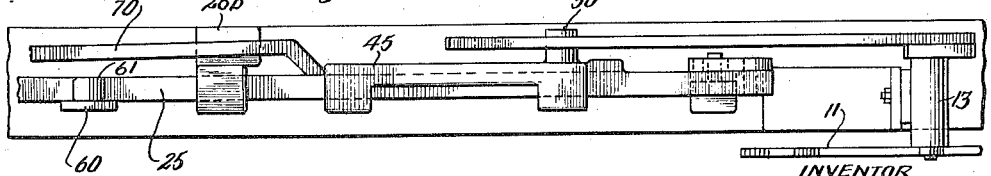
INVENTOR
JAMES H. HOLLYDAY
& PETER L. STURLA
Joseph Allen Brown
ATTORNEY

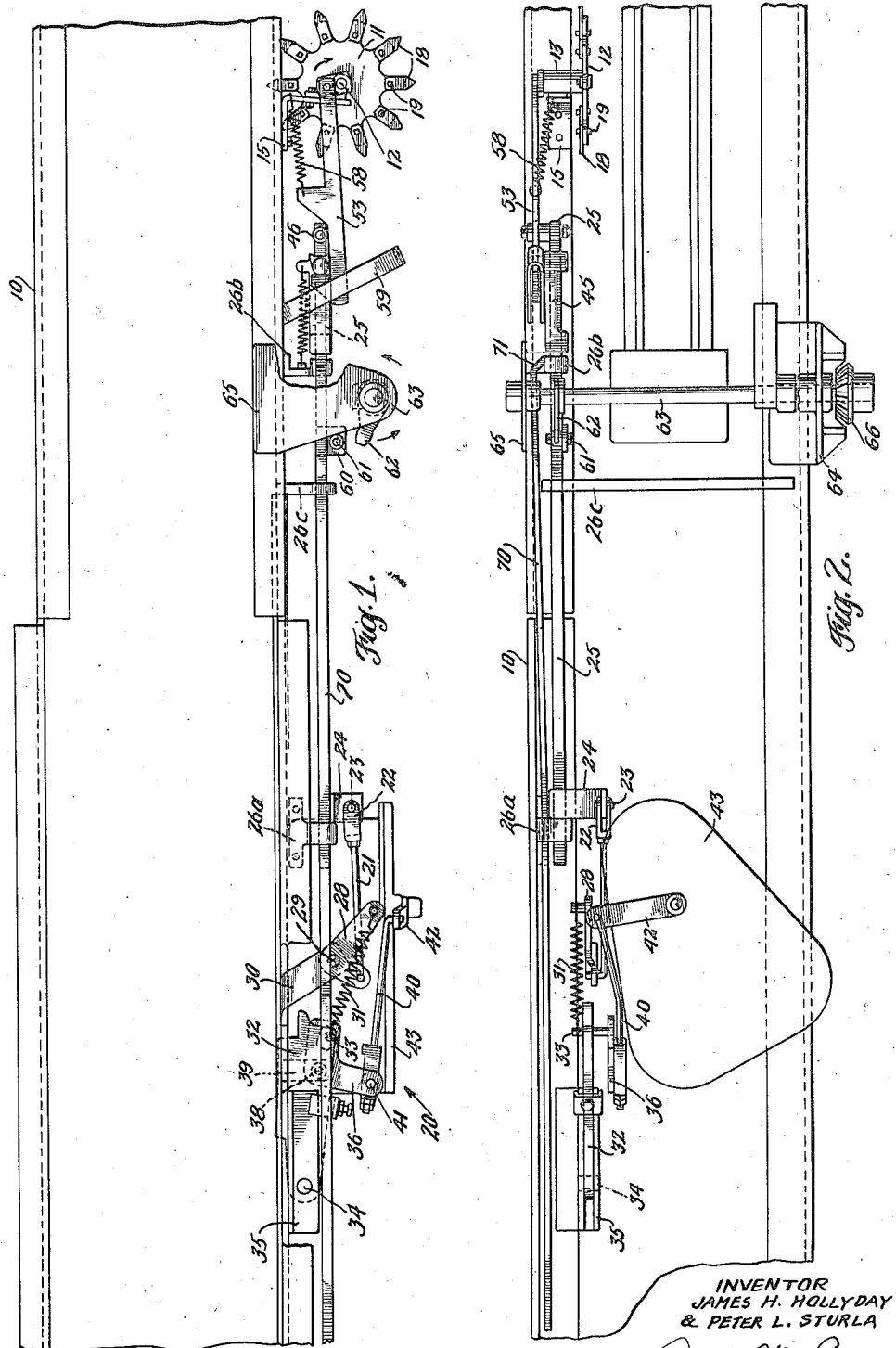

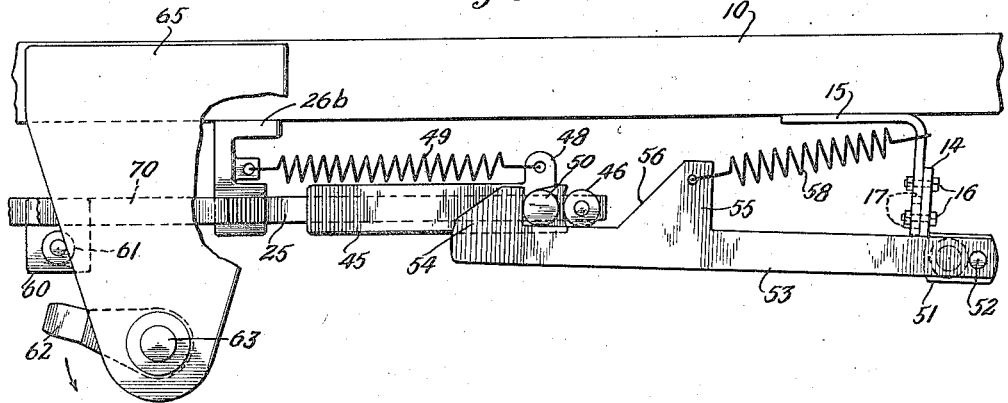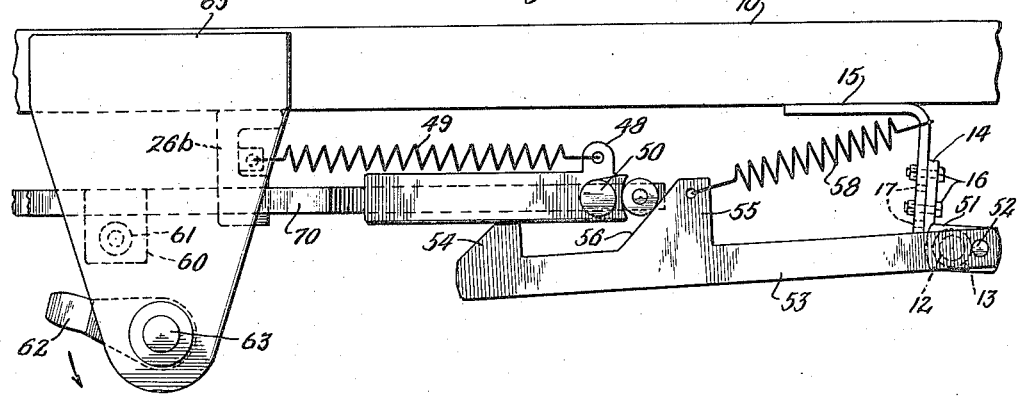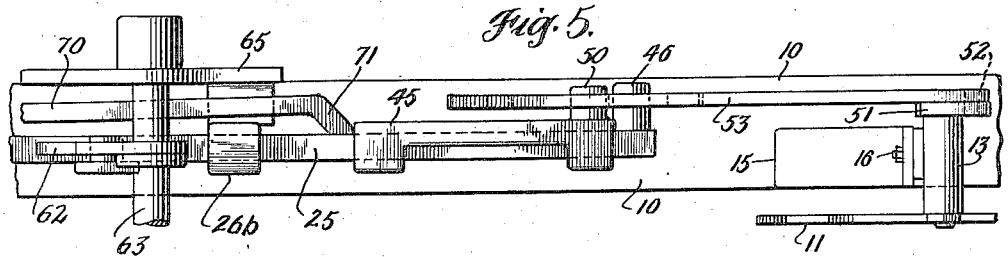

2,859,686

BALE METERING AND TRIPPING MECHANISM

James H. Hollyday, New Holland, and Peter L. Sturla, Churchtown, Pa., assignors to Sperry Rand Corporation, New Holland, Pa., a corporation of Delaware Application February 9, 1956, Serial No. 564,480

8 Claims. (Cl. 100—4)

The present invention relates generally to balers and more particularly to automatic balers of the type in which hay is picked up and fed into a bale casing and into the path of a plunger reciprocable in the casing. The plunger compresses the hay into bales; and upon completion of each bale, the plunger is latched against the bale to hold it under compression while the tying operation takes place. The mechanism which controls the latching of the plunger also initiates operation of the tying mechanism.

Still more specifically this invention relates to an improved bale metering and tripping mechanism such as that shown and described in Nolt, U. S. Patent No. 2,772,628, dated December 4, 1956, and assigned to the assignee of this invention.

The mechanism disclosed in the above mentioned patent includes bale growth responsive means, namely, a star or metering wheel, which engages each bale as it is being formed. The star wheel is rotated by the bale; and when the wheel has been roated approximately one revolution a cam carried on the star wheel engages a pin carried on a trip rod to slide the rod longitudinally. A constantly reciprocable push rod is rendered operative by the sliding of the trip rod to engage the trip rod and slide it further. This further movement of the rod is operative through an over-center mechanism to throw a latch to stop the bale plunger and hold it against a newly found bale. A linkage is connected to the over-center mechanism which is also operated to initiate actuation of the tying mechanism.

While the above mechanism possesses many advantages and constitutes a substantial advance in the art, it, nevertheless, has one major drawback. In order to obtain a positive movement of the plunger latch and a positive actuation of the tying mechanism, an over-center mechanism delivering a powerful throw has to be employed. A pulling force on the trip rod of several hundred pounds is required to operate the over-center mechanism and this force has to be overcome initially by the cam on the star wheel acting against the pin on the trip rod. It is the movement of the bale in the bale case which rotates the star wheel and its cam; and, positively rotating the star wheel from the bale becomes difficult when there is a force on the star wheel of several hundred pounds resisting rotation. The hay of the advancing bale engaging the star wheel teeth may rip; or, if the hay around the star wheel teeth is relatively lightly packed, some compression of the hay around the teeth may have to occur before the hay is able to continue rotation of the wheel. Further, requiring the star wheel to perform such work is undesirable since it subjects the teeth of the star wheel, the bracket supporting the wheel, the star wheel cam and the pin on the trip rod to substantial forces, which result in excessive wear and break down of these parts.

One object of this invention is to provide an improved baler metering and tripping mechanism in which a star wheel is operable to initiate the actuation of an over-center mechanism, but in doing so, has to overcome no material opposing forces.

Another object of this invention is to provide in a device of the character dsecribed an improvde, simplified, linkage between the star wheel and the over-center mechanism.

A further object of this invention is to provide in a device of the character described a star wheel which is adjustably mounted and has means for varying the diameter of the star wheel so that the metering rate of the star wheel may be varied, and the linkage between the star wheel and the over-center mechanism being such that even though the star wheel is adjusted the linkage need not be correspondingly adjusted.

Other objects of this invention will be apparent hereinafter from the specification and from the recital in the appended claims.

In the drawings:

Fig. 1 is a fragmentary plan view of a bale casing having mounted thereon a bale metering and tripping mechanism constructed according to one embodiment of this invention, the mechanism being shown at the initial stage of its operating cycle;

Fig. 2 is a side elevation of Fig. 1;

Figs. 3 and 4 are fragmentary plan views of the tripping mechanism showing the mechanism in other stages of its operating cycle;

Fig. 5 is a side elevation of Fig. 4 and illustrating in particular the operation of the push rod of the device;

Fig. 6 is a view similar to Figs. 3 and 4, but showing the device near the end of an operating cycle and illustrating in particular the actuation of the cam to return the mechanism to its starting position.

Fig. 7 is a plan view of a tripping device constructed according to another embodiment of this invention, the device being shown at the initial stage of its operating cycle;

Fig. 8 is a view similar to Fig. 7, but showing the device near the end of its operating cycle; and Fig. 9 is a side elevation of Fig. 8.

Referring now to the drawings, by numerals of reference, and first to the embodiment shown in Figs. 1–6 inclusive, 10 denotes a bale case of an automatic baler. The baler is adapted to be towed across a field of windrowed hay; and the bale case extends in the direction of travel of the baler. Automatic means picks up the hay and feeds it rearwardly, or towards the right of Fig. 1, and into a feed chamber. An auger, or similar means, feeds the hay transversely and into bale case 10 and into the path of a plunger reciprocable therein. The plunger compresses the hay into bales and forces the bales, as they are formed by successive wads of hay, toward the right in Fig. 1.

The mechanism of this invention includes metering means which engages each bale as it is being formed and is responsive to the growth of the bale. When a bale of appropriate length has been produced, the metering means is operable to actuate an over-center mechanism. The over-center mechanism throws a latch which stops the plunger and holds it against a newly formed bale. It simultaneously throws a lever which initiates the operation of a tying mechanism which bands and ties the bale.

The bale metering and tripping mechanism comprises a star wheel 11 affixed to the end of a shaft 12 rotatable in a fixed bearing-sleeve 13. Sleeve 13 has an arm 14 extending at a tangent from its periphery. Arm 14 is adjustably connected to an L-shaped bracket 15 by means of bolts 16 which are projectable, selectively, through a plurality of holes 17 in the bracket. Bracket 15 is welded or otherwise affixed to bale case 10. By adjusting arm 14 on bracket 15, star wheel 11 may be adjusted inwardly or outwardly relative to the adjacent side of bale case 10.

Star wheel 11 has teeth 18 (Fig. 1), each of which is adjustably connected at 19 to the body of the wheel so that each tooth may be adjusted radially to vary the diameter of the star wheel and to compensate for adjustments of the wheel inwardly or outwardly relative to the bale case. Teeth 18 project through the side of the bale case and engage the bale being formed therein. The star wheel is rotated in the direction of the arrow (Fig. 1) responsive to the growth of the bale.

The adjustability of the diameter of the star wheel is provided so that the size of the bales produced by the baler may be varied, one revolution of the star wheel taking place for each bale formed. Such adjustability is conventional. However, it will be seen hereafter that due to the novel construction of the tripping mechanism adjustment of the metering wheel in no way affects the operation of the tripping mechanism and the tripping mechanism need not be correspondingly adjusted, as required heretofore.

Star wheel 11 is operable to actuate an over-center mechanism 20 (Fig. 1) which comprises an over-center control rod 21 having a clevis 22 at one end. Clevis 22 is connected by a pin 23 to a member 24 affixed to and projecting transversely from a trip rod 25. Trip rod 25 extends parallel to bale case 10; and, it is slidable in three guide brackets, namely, forward bracket 26a, rear bracket 26b and intermediate bracket 26c.

The end of control rod 21 opposite clevis 22 is connected to a toggle 28 pivotally mounted at 29 on a bracket 30 affixed to bale case 10. One end of a spring 31 is connected to toggle 28, as shown in Fig. 1; and, the opposite end of the spring is connected to a plunger latch 32 by means of a pin 33. Latch 32 is pivotally supported at 34 on a bracket 35 affixed to the bale case. The latch is adapted to be pivoted through an opening in the bale case and behind the plunger reciprocable therein to lock the plunger in extended position.

The pin 33 which connects spring 31 to plunger latch 32 also serves to connect the latch to a lever 36. Lever 36 is pivotally supported at 38 on a bracket 39 affixed to bale case 10. A link or rod 40 is connected at 41 to lever 36. The opposite end of rod 40 is connected to a lever 42 which, when thrown to the right from the position shown in Fig. 2, initiates a gear box drive contained in housing 43 to operate a tying mechanism omitted from Figs. 1 and 2 for purposes of clarity.

When rod 21 is shifted toward the right from the position shown in Fig. 1, toggle 28 is swung about pivot 29. The movement of the toggle operates through spring 31 to swing latch 32 about pivot 34 to force it into bale case 10. As the plunger latch is pivoted into the bale case, lever 36 is swung about pivot 38 forcing rod 40 to throw lever 42 to the right to initiate operation of the gear box and tying mechanism.

Over-center mechanism 20 is the same as that shown in Nolt U. S. Patent No. 2,772,628, previously referred to, and it constitutes no part of the present invention. Invention resides in the structure employed to connect star wheel 11 to trip rod 25, and this structure will now be described.

Referring particularly to Figs. 3–6, it will be seen that a slide member 45 is mounted on the rear end of trip rod 25. Slide 45 is interposed between rear trip rod guide 26b and a vertically extending cylindrical cam 46 connected to the trip rod. Slide 45 has a laterally extending ear 48 to which one end of a spring 49 is connected. The opposite end of the spring is connected to rear guide 26b so that slide 45 is constantly urged forwardly, or to the left in Figs. 3–6. Spring 49 is a light spring exerting a pull on slide 45 of only about fifteen pounds.

The rear of slide 45 has an upstanding lug 50 which is utilized to connect the slide to star wheel 11. Star wheel 11 has an arm 51 fixed on the upper end of shaft 12 so that when star wheel 11 is rotated by the growth of a bale in casing 10, arm 51 is simultaneously and correspondingly rotated. Connected to the outer end of arm 51 at 52 is a link 53 having a hook-like catch 54 at one end which is engageable with lug 50 on slide 45. Link 53 has a medial, lateral projection 55 which provides a cam surface 56 against which cam 46 on trip rod 25 is operable. A spring 58 connects projection 55 to L-shaped bracket 15 to exert a pulling force on link 53 toward bale case 10.

A U-shaped bracket 59 (Fig. 1) is provided to support and guide the outer end of link 53. Bracket 59 is welded to bale case 10. The closed portion of the bracket serves as a stop to limit the possible outward extension of link 53.

Affixed to trip rod 25 between guides 26c and 26b is a projection 60 which carries a cylindrical return cam 61. Return cam 61 is engageable by a cam follower 62 mounted on the shaft 63 of the needle drive assembly of the baler. Shaft 63 is supported at its lower end in a drive-bracket 64 (Fig. 2) and at its upper end bracket 65. Both of these brackets are affixed to bale case 10. Shaft 63 is adapted to be rotated by gear 66. The rotation of shaft 63 is controlled from gear box 43 through a mechanism not shown here, but described in detail in Nolt U. S. Patent No. 2,772,628.

Extending above and parallel to trip rod 25 is a push rod 70 which is guided medially in bracket 26a. The forward or left end of the push rod is connected to a source of power which constantly reciprocates the rod in timed relation to the plunger. As shown in Figs. 2 and 5, push rod 70 has a rear end formed with a down-turned nose 71 which, when the metering and tripping mechanism is at rest, slides on top of guide bracket 26b and on top of trip rod slide 45. The push rod is shown retracted in Fig. 2. When extended, when the mechanism is at rest, the nose 71 of the rod rides on slide 45.

The operation of the mechanism will now be described. As a bale is being formed in casing 10, star wheel 11 is rotated by the bale growth, rotating in the direction indicated by the arrow in Fig. 1. Push rod 70 is reciprocating constantly with its nose 71 sliding on top of guide 26b and slide member 45. Link 53 is biased inwardly, toward bale case 10 by spring 58. The catch 54 of link 53 engages lug 50 on push rod slide 45. When arm 51 reaches the position shown in Fig. 1, link 53 begins to pull slide 45 toward the right. When arm 51 has reached the position shown in Fig. 3, slide 45 has been moved away from guide bracket 26b, against the slight resistance of spring 49. Push rod 70, on its next stroke, instead of sliding from guide 26b to the top of slide 45, now drops in behind the slide and onto trip rod 25 as illustrated in Fig. 5. The push rod forces slide 45 against cam 46 and then to the position shown in Fig. 4. Slide 45, in turn, pushes trip rod 25 to the same position because of its engagement therewith through cam 46.

The movement of trip rod 25 to the right actuates over-center mechanism 20, pulling control rod 21 to the right to swing toggle 28 about its pivot so that spring 31 swings plunger latch 32 into bale case 10 to latch behind the plunger reciprocable therein. As latch 32 swings toward the bale case, lever 36 shoves rod 40 to the right to throw lever 42 and thereby institute operation of the tying mechanism.

It will be noted from Fig. 4, that when trip rod 25 has been moved by push rod 70, cam 46 engages the cam surface 56 on projection 55 on link 53 to swing the link away from bale case 10, as shown. Therefore, on retraction of push rod 70, spring 49 is free to move slide 45 back to starting position. On its next outward stroke, push rod 70 again rides on top of guide 26b and slide 45.

As stated, the throwing of lever 42 initiates the operation of the tying mechanism; and shaft 63, which is a component thereof, is rotated. Cam follower 62 swings around and engages cam 61 on projection 60 affixed to trip rod 25, thereby sliding trip rod 25 back to starting position. When the trip rod is moved back, cam 46 becomes disengaged with cam surface 56 on link 53 and the link is again swung inwardly by spring 58.

The return of trip rod 25 is operable through control rod 21 to release plunger latch 32 and return lever 42 to starting position. Upon completion of the succeeding bales, the operation is repeated over and over again.

It will be understood that the throwing of the plunger latch, the actuation of the tying mechanism, the unlatching of the plunger latch and the operation of the tripping mechanism is closely synchronized. In fact, the actuation of all of these elements and the tying of a bale is completed in a matter of seconds.

From the above, it will be seen that star wheel 11, while controlling the tripping of trip rod 25, is subjected to no material forces. It is relegated to the position of merely having to move slide 45 against the slight force of spring 49. Movement of trip rod 25 is handled entirely by push rod 70 operating against slide 45 once the slide has been moved longitudinally by the star wheel through link 53. The result is that the star wheel and its mounting structure, being subjected to performing no material amount of work, has greatly increased life. It will far out last earlier structures in which the star wheel is used directly to move, in whole or in part, the trip rod to the over-center mechanism.

Moreover, the linkage between star wheel 11 and slide 45 is such that even though the star wheel is adjusted, none of the other parts of the tripping mechanism need be adjusted. Previously, when a star wheel cam, engageable with a pin on the trip rod, was employed to move the trip rod, any adjustment of the star wheel required a corresponding adjustment of the trip rod and its bracket mountings so that the trip rod pin would still be in position to be engaged by the star wheel cam. Obviously, the necessity of having to adjust the trip rod is undesirable.

In the embodiment of the invention shown in Figs. 7-9, the parts which are the same as parts shown in Figs. 1-6 bear like numerals. The structure and operation of the linking means between the star wheel and trip rod is essentially the same, the difference being in the means employed to cam away the link between the star wheel and the slide on the trip rod.

The arm 51 on the star wheel carries a link 80 having a catch 81 at its outer end engageable with lug 50 on slide 45. Link 80 is a straight bar, except for catch 81, having no medial cam projection comparable to projection 55 on link 53, previously described.

Trip rod 25 has a protuberance or lug 82 which is positioned to be engaged by slide 45. It also has an extension 83 on which a lever 84 is pivotally mounted. Lever 84 has a cylindrical, laterally projecting cam 85 affixed to one end, as shown. The opposite end of the lever has a slot 86 in which a pin 88 carried on a bracket 89 is slidable. Bracket 89 is welded to bale case 10.

The operation of this embodiment of the invention will be readily apparent by comparing Figs. 7 and 8. Link 80 is operable to move slide 45 to the right and into engagement with lug 82. Push rod 70 is operable to move slide 45 and trip rod 25 further to the right to actuate the over-center mechanism for latching the plunger and initiating the operation of the gear box and tying mechanism. When trip rod 25 is pushed by push rod 70, lever 84 is swung about pin 88 and cam 85 is forced downwardly against link 80 to cam it outwardly from the bale case 10. On retraction of the trip rod by cam follower 62 operable against cam 61, lever 84 is returned to starting position and spring 58 returns link 80.

While this invention has been described in connection with two different embodiments thereof, it will be understood that it is capable of further modification, and this application is intended to cover any variations, uses or adaptations of the invention, following, in general, the principles of the invention and including such departures from the present disclosure as come within known or customary practice in the art to which the invention pertains and as fall within the scope of the invention or the limits of the appended claims.

Having thus described our invention, what we claim is:

1. A bale length measuring and trip mechanism for controlling the operation of a plunger latch and banding means in an automatic baler having a bale case in which a normally reciprocating plunger is held stationary by said latch during a banding cycle, comprising a normally stationary but reciprocably moveable trip rod, a cam on said trip rod, a slidable member normally spaced from said cam, a constantly reciprocable push rod, a bale growth responsive means operative upon completion of a bale in said case to slide said member toward said cam, said push rod being operable after the member has been moved toward said cam to push said trip rod to actuate said plunger latch and said banding means, and means for returning said trip rod and said member to starting position.

2. A bale length measuring and trip mechanism for controlling the operation of a plunger latch and banding means in an automatic baler having a bale case in which a normally reciprocating plunger is held stationary by said latch during a banding cycle, comprising a normally stationary but reciprocably moveable trip rod, a cam on said trip rod, a member slideably mounted on said trip rod and normally spaced from said cam, a constantly reciprocable push rod, bale growth responsive means, means connecting said responsive means to said member whereby on completion of a bale in said case said member is moved toward said cam, said push rod being operable against said member after the member has been moved toward said cam to force said member against the cam and to push said trip rod and said member to actuate said plunger latch and said banding means, and means for returning said trip rod and said member to starting position, said return means being controlled by said banding means.

3. A bale length measuring and trip mechanism for controlling the operation of a plunger latch and banding means in an automatic baler having a bale case in which a normally reciprocating plunger is held stationary by said latch during a banding cycle, comprising a normally stationary but reciprocably moveable trip rod, a cam on said trip rod, a member slideably mounted on said trip rod and normally spaced from said cam, a constantly reciprocable push rod, a rotatably mounted metering wheel extending into said bale case and rotatable responsive to growth of a bale therein, a link connected to said metering wheel and reciprocated thereby, means for connecting said link to said member upon completion of a bale in said case whereby said member is moved toward said cam, said push rod being operable after said member has been moved toward said cam to force said member against the cam and to push said trip rod and said member to actuate said plunger latch and said banding means, said cam engaging said link when said trip rod is pushed by said push rod to disconnect said link from said member, and means for returning said trip rod and said member to starting position.

4. A bale length measuring and trip mechanism for controlling the operation of a plunger latch and banding means in an automatic baler having a bale case in which a normally reciprocating plunger is held stationary by said latch during a banding cycle, comprising a normally stationary but reciprocably moveable trip rod, a cam on said trip rod, a member slideably mounted on said trip rod and normally spaced from said cam, a constantly reciprocable push rod, a rotatably mounted metering wheel extending into said bale case and rotatable responsive to growth of a bale therein, a link connected to said metering wheel and reciprocated thereby, means for connecting said link to said member upon completion of a bale in said case whereby said member is moved toward said cam, said push rod being operable after said member has been moved toward said cam to force said member against the cam and to push said trip rod and said member to actuate said plunger latch and said banding means, said cam engaging said link when said trip rod is pushed by said push rod to disconnect said link from said member, and means for returning said trip rod and said member to starting position, said return means being controlled by said banding means.

5. A bale length measuring and trip mechanism for controlling the operation of a plunger latch and banding means in an automatic baler having a bale case in which a normally reciprocating plunger is held stationary by said latch during a banding cycle, comprising a normally stationary but reciprocably moveable trip rod, a cam on said trip rod, a member slideably mounted on said trip rod, spring means normally holding said member spaced from said cam, a constantly reciprocable push rod, a rotatably mounted metering wheel extending into said bale case and rotatable responsive to growth of a bale therein, a link connected to said metering wheel and reciprocated thereby, said link having a medial, lateral projection provided with an inclined cam surface engageable by said cam, means for connecting said link to said member upon completion of a bale in said case whereby said member is moved by said metering wheel toward said cam, said push rod being operable when said member has been moved toward said cam to force the member against the cam and to push said trip rod and said member to actuate said plunger latch and said banding means, said cam on said trip rod engaging the cam surface on the projection of said link when said trip rod is pushed by said push rod to disconnect said link from said member, and means for returning said trip rod and said member to starting position.

6. A bale length measuring and trip mechanism for controlling the operation of a plunger latch and banding means in an automatic baler having a bale case in which a normally reciprocating plunger is held stationary by said latch during a banding cycle, comprising a normally stationary but reciprocably moveable trip rod, a cam on said trip rod, a member slideably mounted on said trip rod, spring means normally holding said member spaced from said cam, a constantly reciprocable push rod, a rotatably mounted metering wheel extending into said bale case and rotatable responsive to growth of a bale therein, a link connected to said metering wheel and reciprocated thereby, said link having a medial, lateral projection provided with an inclined cam surface engageable by said cam, means for connecting said link to said member upon completion of a bale in said case whereby said member is moved by said metering wheel toward said cam, said push rod being operable when said member has been moved toward said cam to force the member against the cam and to push said trip rod and said member to actuate said plunger latch and said banding means, said cam on said trip rod engaging the cam surface on the projection of said link when said trip rod is pushed by said push rod to disconnect said link from said member, and means for returning said trip rod and said member to starting position, said return means being controlled by said banding means.

7. A bale length measuring and trip mechanism for controlling the operation of a plunger latch and banding means in an automatic baler having a bale case in which a normally reciprocating plunger is held stationary by said latch during a banding cycle, comprising a normally stationary but reciprocably moveable trip rod, a lug on said trip rod spaced inwardly from one end thereof, a medially pivoted lever mounted on said trip rod adjacent said one end, a cam on one end of said lever, said lever having an elongated slot adjacent the end opposite said one end, a fixed pin supported on said bale case and projecting through said slot, a member slideably mounted on said trip rod on the side of said lug remote from said lever, said member being normally spaced from said lug, a constantly reciprocable push rod, bale growth responsive means, a link connecting said responsive means to said member whereby on completion of a bale in said case said member is moved toward engagement with said lug, said push rod being operable when said member has been moved toward said lug to force the member against the lug and to push said trip rod and said member to actuate said plunger latch and said banding means, the movement of said trip rod by said push rod causing said lever to be pivoted and said cam on said lever to disconnect said link from said member, and means for returning said trip rod and said member to starting position.

8. A bale length measuring and trip mechanism for controlling the operation of a plunger latch and banding means in an automatic baler having a bale case in which a normally reciprocating plunger is held stationary by said latch during a banding cycle, comprising a normally stationary but reciprocably moveable trip rod, a lug on said trip rod spaced inwardly from one end thereof, a medially pivoted lever mounted on said trip rod adjacent said one end, a cam on one end of said lever, said lever having an elongated slot adjacent the end opposite said one end, a fixed pin supported on said bale case and projecting through said slot, a member slideably mounted on said trip rod on the side of said lug remote from said lever, said member being normally spaced from said lug, a push rod, means for constantly reciprocating said push rod, a rotatably mounted metering wheel extending into said bale case and rotatable responsive to growth of a bale therein, a link connected to said metering wheel and reciprocated thereby, means for connecting said link to said member upon completion of a bale in said case whereby said member is moved by said metering wheel toward engagement with said lug, said push rod being operable when said member has been moved toward said lug to force the member against the lug and to push said trip rod and said member to actuate said plunger latch and said banding means, the movement of said trip rod by said push rod causing said lever to be pivoted and said cam on said lever to disconnect said link from said member, and means controllable by said banding means for returning said trip rod and said member to starting position.

References Cited in the file of this patent
UNITED STATES PATENTS

| | | |
|---|---|---|
| 2,327,946 | Ward | Aug. 24, 1943 |
| 2,651,252 | Pope | Sept. 8, 1953 |

FOREIGN PATENTS

| | | |
|---|---|---|
| 154,875 | Australia | Jan. 21 1954 |